(12) United States Patent
Zhou et al.

(10) Patent No.: US 10,371,842 B2
(45) Date of Patent: Aug. 6, 2019

(54) ANISOTROPY ANALYSIS USING DIRECT AND REFLECTED ARRIVALS IN SEISMIC SURVEY DATA

(71) Applicant: HALLIBURTON ENERGY SERVICES, INC., Houston, TX (US)

(72) Inventors: Ran Zhou, Houston, TX (US); Bruce Edward Cornish, Spring, TX (US); Donghong Pei, Houston, TX (US); Daniel Joseph Quinn, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 689 days.

(21) Appl. No.: 14/779,288

(22) PCT Filed: Mar. 7, 2014

(86) PCT No.: PCT/US2014/022062
§ 371 (c)(1),
(2) Date: Sep. 22, 2015

(87) PCT Pub. No.: WO2014/164354
PCT Pub. Date: Oct. 9, 2014

(65) Prior Publication Data
US 2016/0054464 A1    Feb. 25, 2016

Related U.S. Application Data

(60) Provisional application No. 61/807,567, filed on Apr. 2, 2013.

(51) Int. Cl.
*G01V 1/30* (2006.01)
(52) U.S. Cl.
CPC .............. *G01V 1/305* (2013.01); *G01V 1/306* (2013.01); *G01V 2210/626* (2013.01)

(58) Field of Classification Search
CPC ... G01V 1/305; G01V 1/306; G01V 2210/626
See application file for complete search history.

(56) References Cited

U.S. PATENT DOCUMENTS

2005/0207278 A1    9/2005   Reshef et al.
2008/0298174 A1   12/2008   Tang et al.
(Continued)

FOREIGN PATENT DOCUMENTS

WO    2014/164354    10/2014

OTHER PUBLICATIONS

AU First Examination Report, dated Jun. 17, 2016, Appl No. 2014249423, "Anisotropy Analysis Using Direct and Reflected Arrivals in Seismic Survey Data," filed Apr. 2, 2013, 2 pgs.
(Continued)

*Primary Examiner* — Telly D Green
(74) *Attorney, Agent, or Firm* — Benjamin Fite; Parker Justiss, P.C.

(57) ABSTRACT

A seismic data analysis system includes seismic receivers to collect seismic survey data, wherein the seismic survey data includes direct and reflected arrival data in response to at least one seismic source fired at different shot offsets. The system also includes memory that stores the collected seismic survey data. The system also includes a processing unit that extracts traveltimes for direct and reflected arrivals from the seismic survey data and performs an inversion using the direct and reflected arrival traveltimes simultaneously to determine anisotropy parameters, including Thomsen parameters, epsilon ($\varepsilon$) and delta ($\delta$), for at least one layer of a vertical transversely isotropic (VTI) model.

23 Claims, 5 Drawing Sheets

(56) References Cited

U.S. PATENT DOCUMENTS

| | | | |
|---|---|---|---|
| 2010/0027376 A1* | 2/2010 | Washbourne | G01V 1/28 367/25 |
| 2010/0128562 A1* | 5/2010 | Blias | G01V 1/42 367/35 |
| 2010/0133010 A1 | 6/2010 | Blias | |
| 2012/0185171 A1* | 7/2012 | Sun | G01V 1/303 702/18 |

OTHER PUBLICATIONS

EP Extended Search Report, dated Oct. 14, 2016, Appl No. 14779193.3, "Anisotropy Analysis Using Direct and Reflected Arrivals in Seismic Survey Data," Filed Mar. 7, 2014, 8 pgs.

Arnaud, Jean, et al., "The Ninth International Workshop on Seismic Anisotropy (9IWSA)," Geophysics, Jul.-Aug. 2001, p. 1294-1312, vol. 66, No. 4, Society of Exploration Geophysicists.

Chen, Jingyi et al., "Constraining the anisotropy structure of the crust by joint inversion of seismic reflection travel times and wave polarizations," J Seismol, 2009, p. 219-240, Springer Science + Business Media B.V.

Tsvankin, Ilya, et. al, "Seismic anisotropy in exploration and reservoir characterization: An overview," Geophysics, Sep.-Oct. 2010, p. 75A15-75A29, vol. 75, No. 5, Society of Exploration Geophysicists.

Blias, Emil, et al., "Interval Anisotropic Parameter Estimation Above the Receiver Array in Walkaway and 3D VSP Data", SEG Denver 2010 Annual Meeting, pp. 243-247.

Zhou, R., et al., "Anisotropy Evaluation Using an Array Walkaway VSP", Offshore Technology Conference, Houston, TX, May 1-4, 2006, OTC-18177-PP; 8 pgs.

PCT International Search Report and Written Opinion, dated Jul. 8, 2014, Appl No. PCT/US2014/022062, "Anisotropy analysis Using Direct and Reflected Arrival in Seismic Survey Data," Filed Mar. 7, 2014, 15 pgs.

PCT International Preliminary Report on Patentability, dated May 21, 2015, Appl No. PCT/US2014/022062, "Anisotropy analysis Using Direct and Reflected Arrival in Seismic Survey Data," Filed Mar. 7, 2014, 13 pgs.

\* cited by examiner

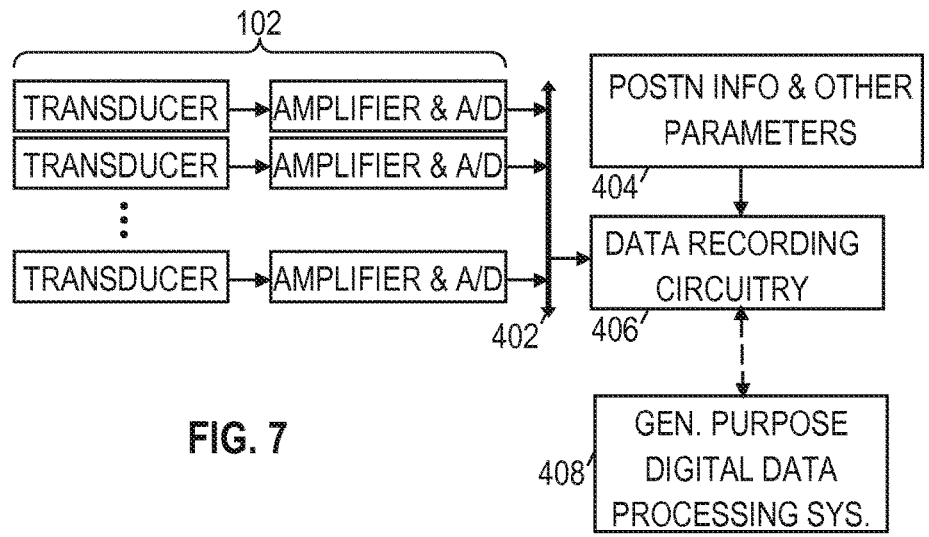
FIG. 7
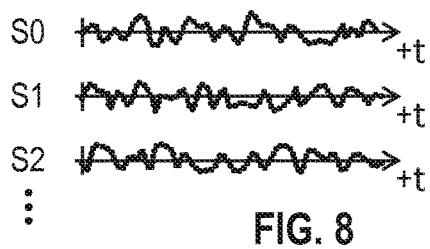
FIG. 8
Fig. 9
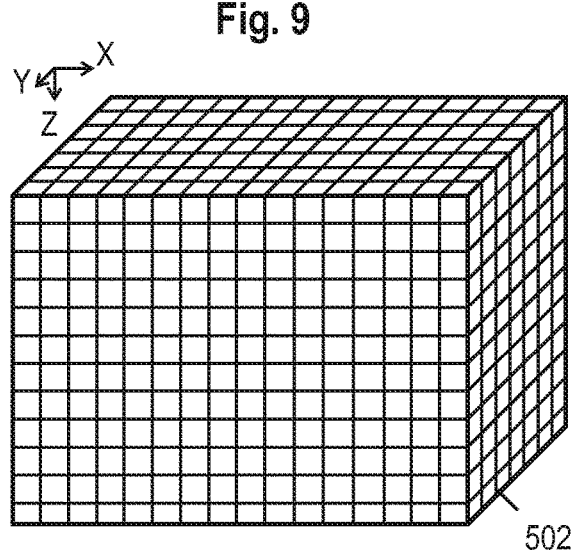

ANISOTROPY ANALYSIS USING DIRECT AND REFLECTED ARRIVALS IN SEISMIC SURVEY DATA

CROSS-REFERENCE TO RELATED APPLICATIONS

This application claims priority to U.S. Provisional Application No. 61/807,567, entitled "Optimizing VSP Anisotropy Surveys With Reflection Data," filed Apr. 2, 2013, and incorporated herein by reference as is in its entirety.

BACKGROUND

Subsurface explorationists often employ seismic surveys to analyze subsurface structures. One particular type of seismic survey, Vertical Seismic Profiling (VSP), combines the use of downhole seismic sensors with seismic sources on the surface. Often, the downhole seismic sensors are multi-component sensors spaced along a borehole to form a subsurface sensing array. The array may, in some cases, extend the entire length of the borehole, though it is more common to have the array limited to the region of interest and the vicinity thereof (The sensors in this region generally exhibit the highest sensitivity to the desired formation parameters.)

The structure of the subsurface is commonly characterized as a series of substantially horizontal layers. This characterization is not a requirement, but it is a useful starting point for an initial velocity model. The initial velocity model, often derived from independent sources (e.g., experience, borehole logs, educated guesswork) or extracted from the data using classical methods, is iteratively refined until it converges on a useful representation of the actual subsurface structure. This refining is often done by comparing the measured seismic wave arrival times with those predicted using the velocity model, and adapting the model in ways that gradually reduce any mismatches. It is common to consider not only the mismatches in first arrival times of seismic waves (so-called "direct arrivals" because they have taken the most direct path), but also the mismatches in later arrivals which result from seismic waves taking more indirect routes, e.g., by reflecting from acoustic impedance mismatches between strata (formation layers).

To reduce the complexity of the solution process, the velocity model can, in some cases, be constrained. For example, the horizontal strata model assumption may be enforced, or the model may only be permitted to vary in the two-dimensional plane of the (inclined or deviated) borehole. Further, the velocity model may in some cases be limited to a fully isotropic velocity within each layer, though in the present disclosure the velocity of each layer is permitted to be anisotropic (transverse isotropy with a vertical symmetry axis).

With the foregoing context, traditional VSP surveys may fail to fully exploit the anisotropy information that can be derived from reflected arrivals. Efforts to improve the accuracy and efficiency of VSP surveys are ongoing.

BRIEF DESCRIPTION OF THE DRAWINGS

Accordingly, there are disclosed herein techniques that invert direct and reflected arrivals in seismic survey data simultaneously to determine anisotropy parameters for at least one layer a vertical transversely isotropic (VTI) model. In the drawings:

FIG. 7 shows an illustrative seismic survey recording system.

FIG. 8 shows illustrative seismic signals.

FIG. 9 shows an illustrative data volume.

Figure 1:
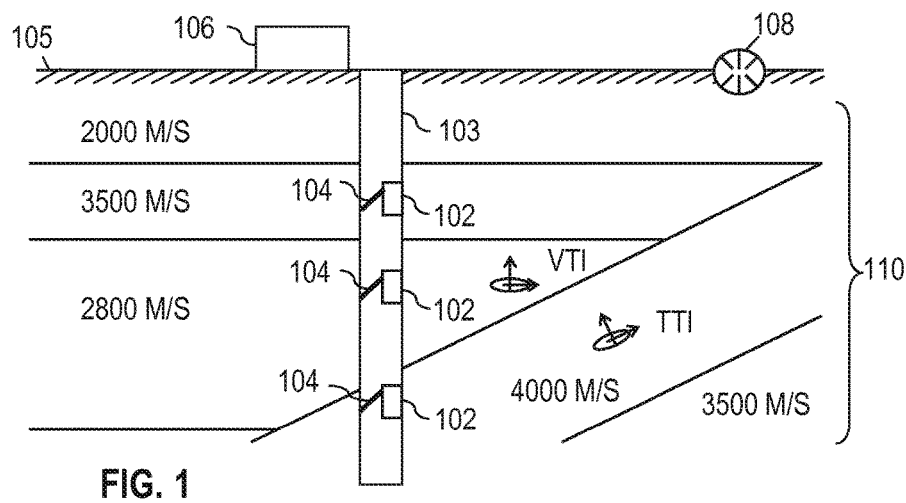
FIG. 1 shows an illustrative seismic survey environment.

It should be understood, however, that the specific embodiments given in the drawings and detailed description below do not limit the disclosure. On the contrary, they provide the foundation for one of ordinary skill to discern the alternative forms, equivalents, and other modifications that are encompassed in the scope of the appended claims.

DETAILED DESCRIPTION

Disclosed embodiments are directed to seismic data analysis systems and methods, where seismic receivers collect seismic survey data, including direct and reflected arrival data corresponding to shots from at least one source at different offsets. In at least some embodiments, an inversion is performed using the collected direct and reflected arrival data simultaneously to determine anisotropy parameters, including Thomsen parameters epsilon ($\varepsilon$) and delta ($\delta$), for at least one layer of a vertical transversely isotropic (VTI) model.

As described herein, reflected arrivals substantially increase traveltime sensitivity and provide supplemental data to the incidence angle range offered by the direct arrivals from a seismic source at a given shot location to a receiver. When reflected arrivals are taken into account, it becomes possible to improve survey efficiency by choosing a geometry with fewer shot locations that nevertheless offers data acquisition with the desired resolution and accuracy. Further, reflected arrivals have higher sensitivity to one or more anisotropy parameters of interest. Accordingly, the disclosed technique processes both direct arrival and reflected arrival data to determine a depth profile of anisotropic parameters. Simultaneous inversion of direct arrival data and reflected arrival data can provide better resolution for one or more of the anisotropy parameters than the direct arrivals alone.

More specifically, the traveltime sensitivity of Thomsen parameters $\varepsilon$ and $\delta$ varies as a function of incidence (or phase) angles. In the mid-angle range, traveltime is more sensitive to parameter $\delta$, whereas in the near-horizontal incidence angle region, traveltime is more sensitive to parameter $\varepsilon$. If the two parameters are similar in magnitude, $\varepsilon$ can be much more influential than $\delta$ and thus can be better resolved. Because the two Thomsen parameters have different influence ranges, surveying the key angle (or offset) range ensures better resolution of the parameters. If a full range of data is collected, proper weighting in the disclosed anisotropy analysis may reduce uncertainty in the estimation. Alternatively, the disclosed anisotropy analysis can be divided into two steps using long offsets for $\varepsilon$ estimation and mid offsets for $\delta$ while $\varepsilon$ retains the estimated value.

Layer thickness tests indicate that the uncertainty of anisotropy parameters increases as layers become thinner and that the traveltime change resulting from anisotropy becomes comparable to other errors. Accordingly, adding reflected arrival data to the anisotropy analysis as described herein can help constrain the anisotropy estimation because reflected arrival data has increased traveltime sensitivity. The reflected arrival data can extend or fill in gaps in the vertical angle range covered by the direct arrivals.

In accordance with at least some embodiments, pre-survey modeling identifies the maximum shot offset and key angle (or shot offset) range for the anisotropic parameters. Resolution and uncertainty of the anisotropy estimation depends on the selection of shot offset range, layer thickness, magnitude of anisotropy, and wave mode. Using reflected arrival data in conjunction with direct arrival traveltimes can reduce the uncertainty in anisotropy estimation, particularly for interval parameters in a layered medium.

The disclosed systems and methods are best understood when described in an illustrative usage context. Accordingly, FIG. 1 shows one illustrative seismic survey environment, in which seismic receivers 102 are in a spaced-apart arrangement within a borehole 103 to detect seismic waves. As shown, the receivers 102 may be fixed in place by anchors 104 to facilitate sensing seismic waves. The environment of FIG. 1 is just one illustrative example. In different embodiments, the receivers 102 may be part of a logging-while-drilling (LWD) tool string or wireline logging tool string. Further, the receivers 102 communicate wirelessly or via cable to a data acquisition unit 106 at the surface 105, where the data acquisition unit 106 receives, processes, and stores seismic signal data collected by the receivers 102. Surveyors trigger a seismic energy source 108 (e.g., a vibrator truck) at one or more positions to generate seismic energy waves that propagate through the earth 110. Such waves refract through and reflect from acoustic impedance discontinuities to reach the receivers 102, which digitize and record the received seismic signals. The receivers 102 concurrently or in turn communicate their respective seismic signal data to the data acquisition unit 106, which stores the collected seismic signal data for later analysis to identify. Illustrative discontinuities include faults, boundaries between formation beds, and boundaries between formation fluids. The discontinuities may appear as bright spots in the subsurface structure representation that is derived from the seismic signal data.

The illustrative subsurface model of FIG. 1 includes three relatively flat formation layers and two dipping formation layers of varying composition and hence varying speeds of seismic waves. Within each formation, the speed of seismic waves can be isotropic (i.e., the same in every direction) or anisotropic. Due to the layered structure of sedimentary rocks transverse isotropy is common in anisotropic formations. In other words the speed of seismic waves in anisotropic formations is the same in every "horizontal" direction, but is different for seismic waves traveling in the "vertical" direction. Note, however, that geologic activity can change formation orientations, turning a VTI formation into a tilted transversely isotropic (TTI) formation. In FIG. 1, the third flat layer is VTI, while the first dipping formation layer is TTI. In at least some embodiments, the disclosed anisotropy analysis technique determines anisotropy parameters for a VTI model.

The survey configuration of FIG. 1 corresponds to a vertical seismic profiling (VSP) survey configuration, where positions for surface source(s) and downhole receivers (e.g., as shown in example environment of FIG. 1) are used to interpret the collected seismic survey data. In alternative embodiments, a reverse VSP (RVSP) survey configuration may be employed, where positions for downhole source(s) and surface receivers are used to interpret the collected seismic survey data. Additionally or alternatively, VSP survey configurations, RVSP survey configurations, and/or cross-well survey configurations may be employed, where positions for downhole source(s) and downhole receivers are used to interpret collected seismic survey data. It should be appreciated that downhole source(s) may be above downhole receivers and/or below downhole receivers. Further, downhole source(s) and downhole receivers may be positioned in one borehole and/or in different boreholes.

Figure 2:
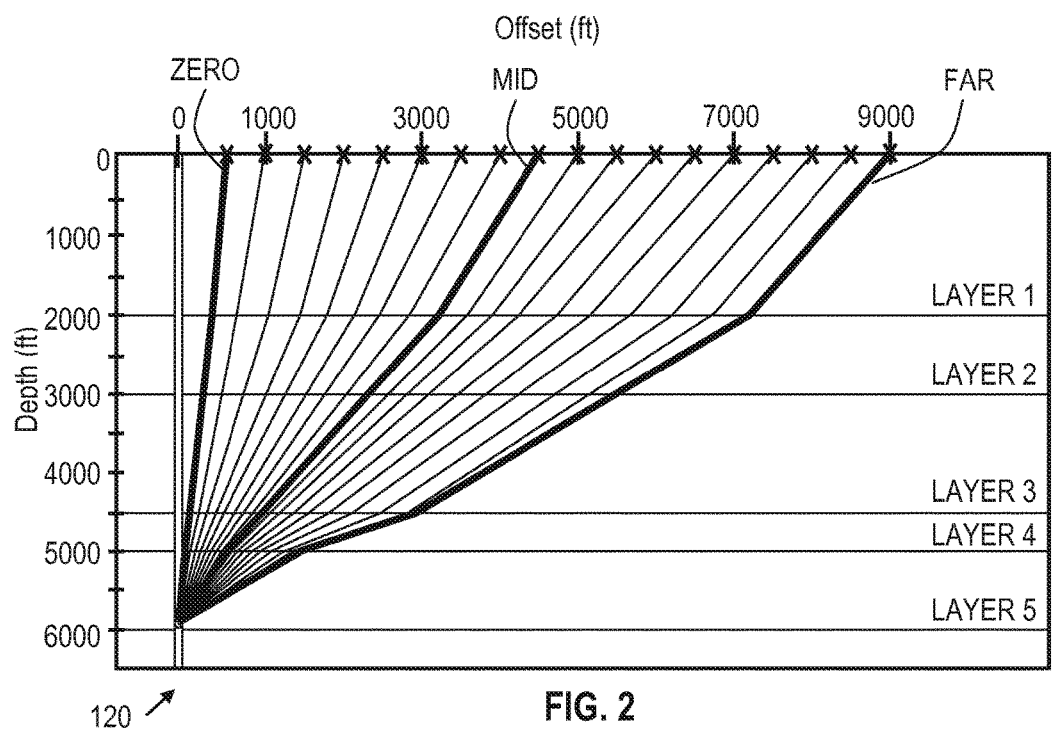
FIG. 2 shows a chart with illustrative direct arrival data using different offsets.
Figure 3:
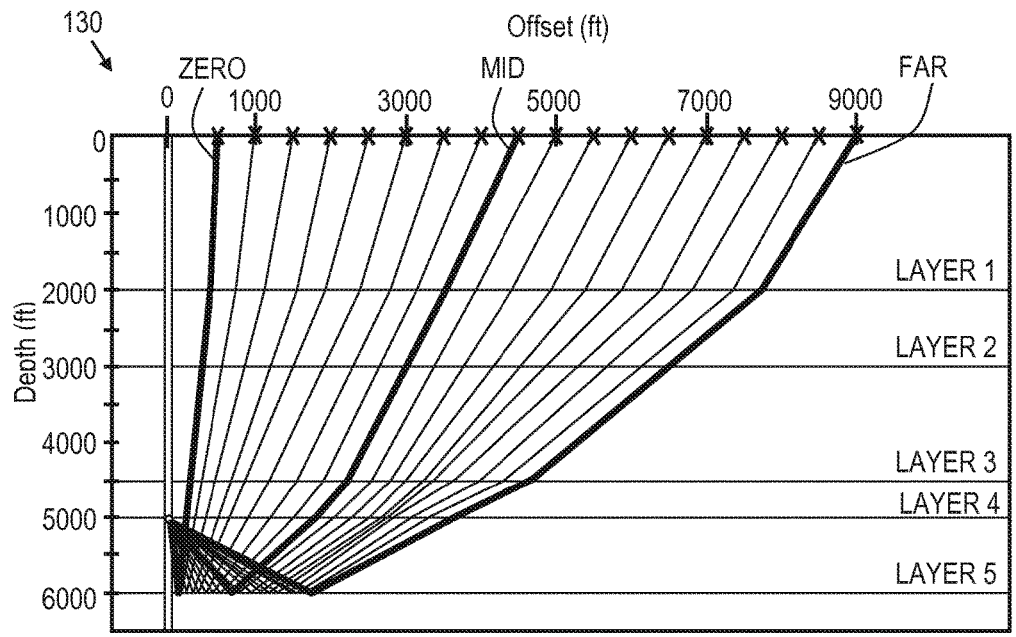
FIG. 3 shows a chart with illustrative reflected arrival data using different offsets.

FIG. 2 shows a chart 120 with illustrative ray paths representing direct arrival data from different shot offsets. In chart 120, five horizontal layers (labeled 1-5) are represented as well as direct arrival signals from 18 different shot offsets (e.g., a set of walkaway shots). FIG. 3 shows a chart 130 with illustrative ray paths representing reflected arrival data using the same offsets. In chart 130 of FIG. 3, the same five horizontal layers (labeled 1-5) shown in FIG. 2 are again represented as well as reflected arrival signals from 18 different shot offsets. Three of the direct arrival signals in chart 120 and three of the reflected arrival signals in chart 130 are bolded and are associated with a zero shot offset, a mid shot offset, and a far shot offset. In at least some embodiments, the zero shot offset, the mid shot offset, and the far shot offset correspond to a predetermined reduced shot configuration that provides arrival signals with sensitivity to the anisotropy parameters. Such sensitivity to the anisotropy parameters can be obtained with relatively few shots (e.g., 2 to 4 shots) if the arrival angles corresponding to the shots are sufficiently varied and include at least one wide arrival angle (e.g., 60 degrees or more). While the predetermined reduced shot configuration of charts 120 and 130 correspond to three shots at particular shot positions, it should be understood that the number of shots in a reduced shot configuration and/or their positions may vary. Further, charts 120 and 130 only illustrate direct arrival data and reflected arrival data for layer 5. Similar direct arrival data and reflected arrival data may be collected and/or plotted for each of the other illustrated layers in charts 120, 130 and/or other layers of a formation. It should be noted that while charts 120 and 130 correspond to a seismic survey configuration with surface source(s) and downhole receivers, other survey configurations are possible.

Figure 4:
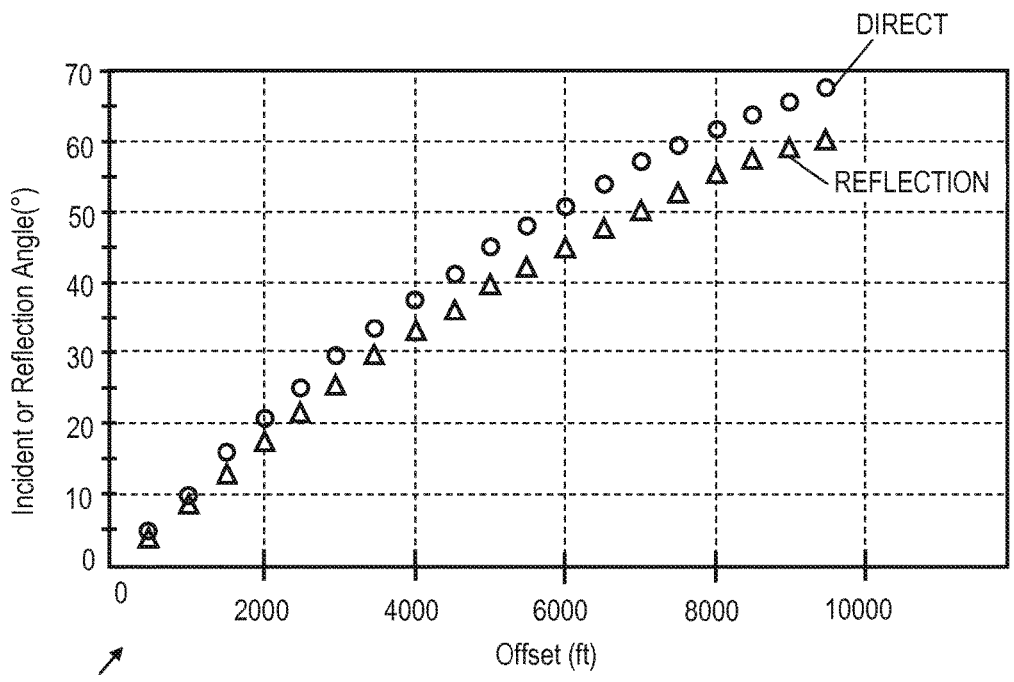
FIG. 4 shows a chart with illustrative direct and reflected arrival angles as a function of shot offset.

FIG. 4 shows a chart 140 with illustrative direct and reflected arrival angle data (direct arrival angle data is represented as circles while the reflected arrival angle data is represented as triangles) as a function of shot offset. The arrival angles are measured from the vertical axis, though direct arrivals are measured relative to the upward direction and reflected arrivals are measured relative to the downward direction. The direct and reflected arrival angles shown in chart 140 correspond to signal arrivals for layer 5 in response to the shot offsets represented in charts 120 and 130. As shown, both the direct and reflected arrival angles for layer 5 increase as the shot offset increases. Similar direct and reflected arrival angle data may be collected and/or plotted for each of the layers 1-5 illustrated in charts 120, 130 and/or other layers of a formation.

Figure 5:
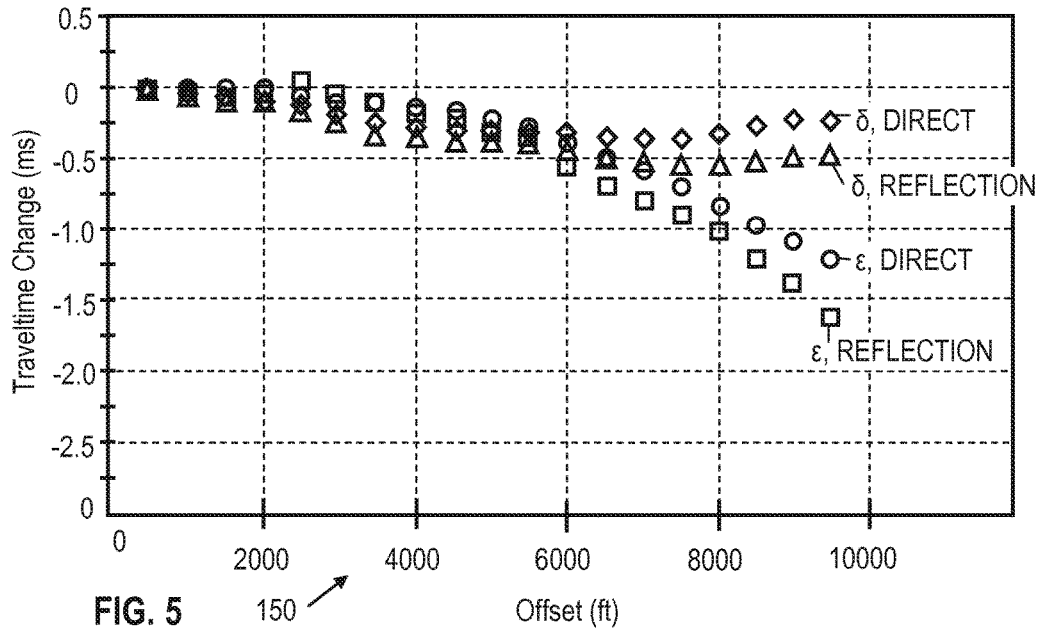
FIG. 5 shows a chart with illustrative traveltime sensitivity data as a function of shot offset.

FIG. 5 shows a chart 150 with illustrative traveltime sensitivity data as a function of shot offset. The direct and reflected arrival traveltimes shown in chart 150 correspond to signal arrivals for layer 5 in response to the shot offsets represented in charts 120 and 130. In FIG. 5, traveltime sensitivities related to Thomsen parameters $\delta$ and $\varepsilon$ are represented. More specifically, direct arrival traveltime sensitivities related to δ are represented as diamonds, reflected arrival traveltime sensitivities related to δ are represented as triangles, direct arrival traveltime sensitivities related to ε are represented as circles, and reflected arrival traveltime sensitivities related to δ are represented as squares. As shown, ε is more influential to far shot offsets than δ. Also, ε is more influential to reflected arrivals than direct arrivals. Similar traveltime sensitivity data may be collected and/or plotted for each of the layers 1-5 illustrated in charts 120, 130 and/or other layers of a formation. The traveltime sensitivity for each anisotropic parameter is calculated numerically from a partial derivative of an anisotropic traveltime equation with respect to the anisotropic parameter at every phase angle or offset.

Figure 6:
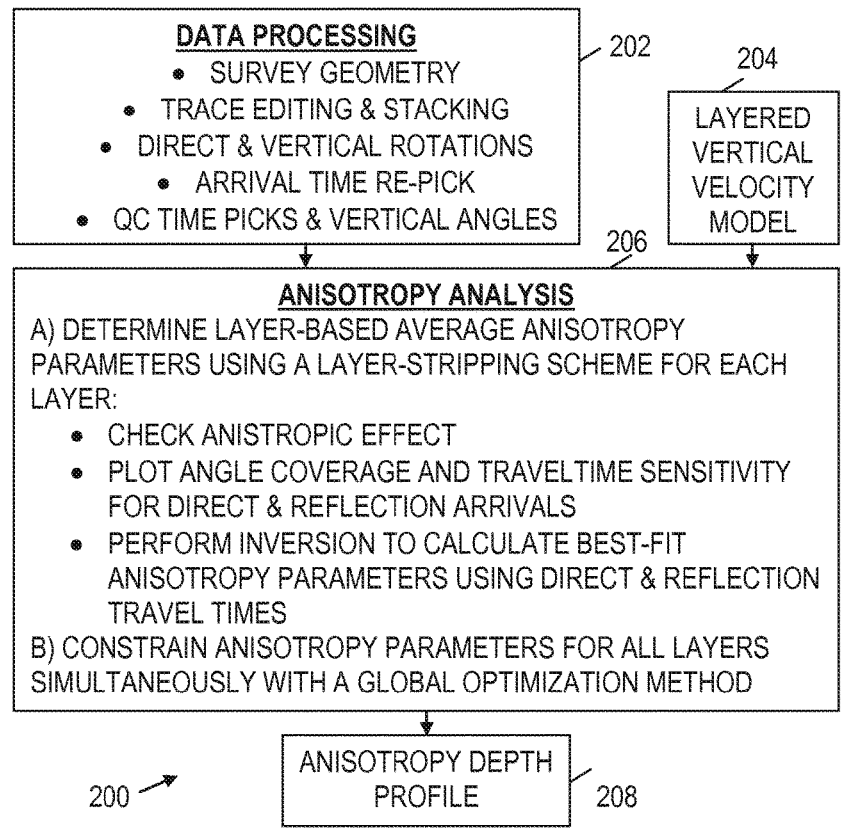
FIG. 6 shows an illustrative flowchart of a seismic data analysis process.

FIG. 6 shows an illustrative flowchart of a seismic data analysis process 200. In process 200, data processing step 202 includes known seismic survey geometry operations, trace editing and stacking operations, direct and vertical rotation operations, arrival time re-pick operations, and quality control (QC) time pick and vertical angle operations. At least some of the results of the data processing step 202 are provided to anisotropy analysis block 206. The anisotropy analysis block 206 also receives as input a layered vertical velocity model 204. At block 206, various operations are performed to determine anisotropy parameters for each of a plurality of layers. In at least some embodiments, layer-based average anisotropy parameters are determined using a layer-stripping scheme. For each layer, an anisotropic effect is checked. For example, in at least some embodiments, the anisotropy effect may be checked by analyzing the traveltime contribution of each layer for evidence of anisotropy (e.g., by determining velocities associated with the contributions and searching for a dependence on incidence angle). If a layer is determined to be isotropic, the later steps to determine the anisotropy parameters may be omitted. Meanwhile, if evidence of anisotropy exists, angle coverage and traveltime sensitivity data is plotted for direct arrivals and reflected arrivals. For example, in at least some embodiments, traveltime sensitivity is plotted as a function of incidence angle and a weighting function is derived for the covered incidence angles. For example, in at least some embodiments, the weighting function is a series of positive scalers for individual data points, which are proportional to the sensitivity function and applied to the traveltime misfit function, to increase the influence of data with higher sensitivity in the inversion. Further, an inversion is performed to calculate best-fit anisotropy parameters using direct arrival traveltimes and reflected arrival traveltimes.

In at least some embodiments, the layer-stripping scheme of block 206 assumes that the anisotropy throughout each layer is constant. For a VSP survey configuration, layer-stripping may involve working downward from the top layer and treating the velocity information for the layers above the given layer as fixed, such that the contribution of the given layer to the traveltimes for direct arrivals to receivers in the given layer are determined. Further, reflections from the bottom of the given layer to the receivers in and above the given layer are determined. For RVSP or cross-well survey configurations, the order of layer-stripping operations would vary depending on the position of the source(s) relative to the receivers.

With the weighting function and angular dependence of the traveltimes, an inversion is performed to calculate the best-fit anisotropy parameters for the given layer. This inversion simultaneously accounts for the traveltime dependence of both direct arrivals and reflected arrivals on anisotropy. The inversion can employ any suitable inversion technique, including generalized inverse, and a grid search scheme. Once the inversion yields the parameters for the current layer, the offset and traveltime information for the next layer are adjusted accordingly. The process is repeated until the velocity model has been refined for all layers above and including the lowermost layer of interest. The velocity model resulting from the layer stripping-scheme may then be treated as an initial velocity model for a global inversion that constrains the anisotropy parameter values. In at least some embodiments, a tomographic ray-tracing inversion technique is then used to determine a globally optimal velocity model. The anisotropy parameters determined at block 206 are used to determine an anisotropy depth profile at block 208.

FIG. 7 shows an illustrative seismic survey recording system having receivers 102 (see e.g., FIG. 1) coupled to a bus 402 to communicate digital signals to data recording circuitry 406. Position information sensors 404 (and optionally sensors for other parameters) are also coupled to the data recording circuitry 406 to enable the data recording circuitry to store additional information useful for interpreting the recorded data. For example, such additional information can include source waveform characteristics, digitization settings, detected faults in the system, etc.

Recording circuitry 406 stores the high speed data stream(s) from receivers 102 to a nonvolatile storage medium such as a storage array of optical or magnetic disks. The data is stored in the form of (possibly compressed) seismic traces, each trace being the signal detected and sampled by a given receiver in response to a given shot. The associated shot and receiver positions are also stored. Illustrative seismic signals are shown in FIG. 8. The signals indicate some measure of seismic wave energy as a function of time (e.g., displacement, velocity, acceleration, pressure), and they are digitized at high resolution (e.g., 16 to 32 bits) at a programmable sampling rate (e.g., 400 to 1000 Hz) for a fixed duration after each shot (e.g., 30 seconds). Such signals can be grouped in different ways, and when so grouped, they are called a "gather". For example, a "receiver gather" is the group of traces that are acquired by a given receiver. A "shot gather" is the group of traces recorded for a single firing of the seismic source.

A general purpose data processing system 408 receives the acquired seismic survey data from the data recording circuitry 406. In some cases the general purpose data processing system 408 is physically coupled to the data recording circuitry and provides a way to configure the recording circuitry and perform preliminary processing in the field. More typically, however, the general purpose data processing system is located at a central computing facility with adequate computing resources for intensive processing. The survey data can be transported to the central facility on physical media or communicated via a computer network. In at least some embodiments, the processing system 408 includes a user interface having a graphical display and a keyboard or other method of accepting user input and/or enabling users to view and analyze the subsurface structure images derived from collected seismic survey data.

The recorded seismic survey data is of little use when maintained in the format of FIG. 7. Although it is possible to plot the various recorded waveforms side by side in a plot that reveals large scale subsurface structures, such structures are distorted and finer structures cannot even be seen. Hence the data is processed to create a data volume 502, i.e., a three dimensional array of data values such as that shown in FIG. 9. The data volume 502 represents some seismic attribute throughout the survey region. In some embodiments, the data volume 502 comprises uniformly-sized cells, each cell having a data value representing the seismic attribute for that cell. Various seismic attributes may be represented, and in some embodiments, each cell has multiple data values to represent multiple seismic attributes. Examples of suitable seismic attributes include reflectivity, acoustic impedance, acoustic velocity, anisotropy parameters, and density. The volumetric data format readily lends itself to computational analysis and visual rendering, and for this reason, the data volume of FIG. 9 may be termed a "three-dimensional image" of the survey region.

Figure 10:
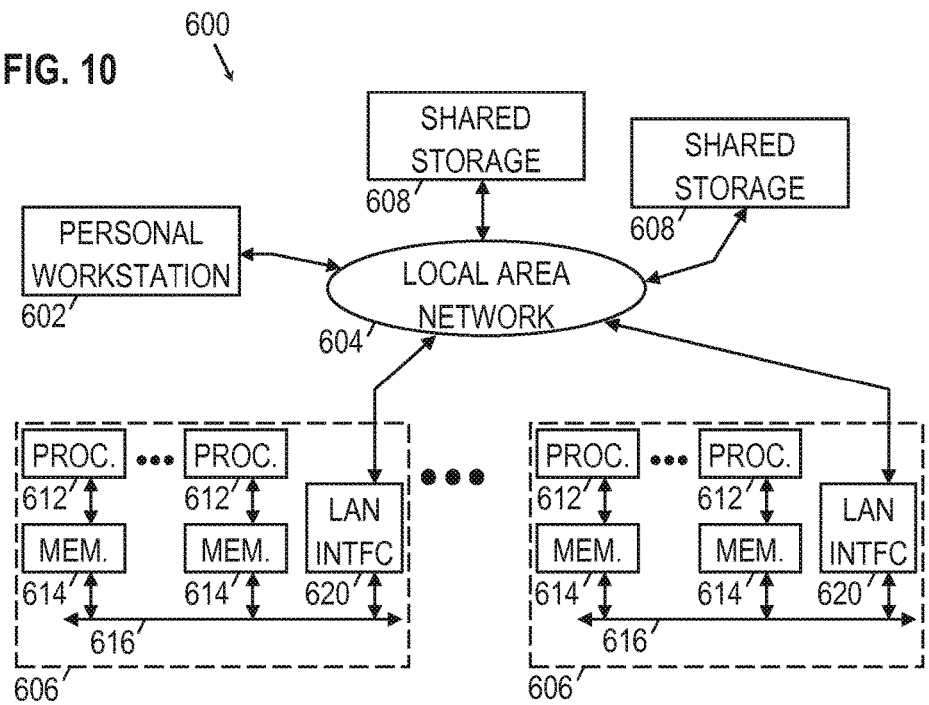
FIG. 10 shows an illustrative computer system for performing seismic data processing.

FIG. 10 shows an illustrative computer system 600 for performing an inversion using collected direct and reflected arrival data to simultaneously determine anisotropy parameters for at least one layer a vertical transversely isotropic (VTI) model as described herein. In computer system 600, a personal workstation 602 is coupled via a local area network (LAN) 604 to one or more multi-processor computers 606, which are in turn coupled via the LAN to one or more shared storage units 608. Personal workstation 602 serves as a user interface to the processing system, enabling a user to load survey data into the system, to retrieve and view image data from the system, and to configure and monitor the operation of the processing system. Personal workstation 602 may take the form of a desktop computer with a graphical display that graphically shows survey data and images of the survey region, and with a keyboard that enables the user to move files and execute processing software.

LAN 604 provides high-speed communication between multi-processor computers 606 and with personal workstation 602. The LAN 604 may take the form of an Ethernet network. Meanwhile, multi-processor computer(s) 606 provide parallel processing capability to enable suitably prompt conversion of seismic trace signals into a survey region image. Each computer 606 includes multiple processors 612, distributed memory 614, an internal bus 616, and a LAN interface 620. Each processor 612 operates on an allocated portion of the input data to produce a partial image of the seismic survey region. Associated with each processor 612 is a distributed memory module 614 that stores conversion software and a working data set for the processor's use. Internal bus 616 provides inter-processor communication and communication to the LAN networks via interface 620. Communication between processors in different computers 606 can be provided by LAN 604.

Shared storage units 608 may be large, stand-alone information storage units that employ magnetic disk media for nonvolatile data storage. To improve data access speed and reliability, the shared storage units 608 may be configured as a redundant disk array. Shared storage units 608 initially store a velocity data volume and shot gathers from a seismic survey. The illumination matrix values and/or reflectivity image volumes can be stored on shared storage units 608 for later processing. In response to a request from the workstation 602, the image volume data can be retrieved by computers 606 and supplied to workstation for conversion to a graphical image to be displayed to a user.

Figure 11:
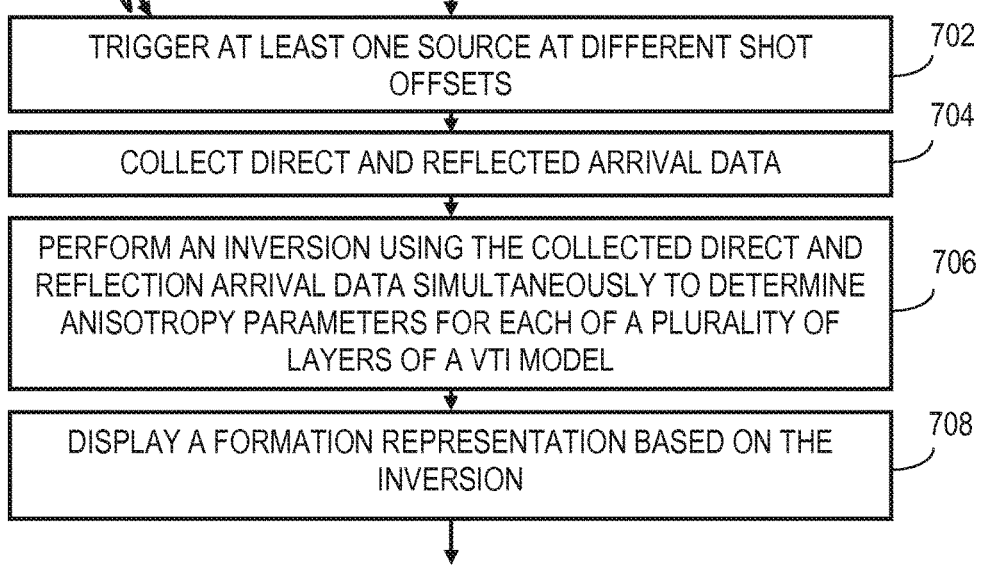
FIG. 11 shows an illustrative seismic data analysis method.

FIG. 11 shows an illustrative seismic analysis method 700. The method 700 may be performed at least in part by a computer system such as systems 408, and/or 600 described herein. In method 700, at least one source is triggered at different offsets (block 702). At block 704, direct and reflected arrival data for a seismic survey configuration is collected in response to the shots performed at block 702. As an example the direct and reflected arrival data may be collected by a plurality of downhole seismic receivers in response to shots from one or more seismic sources at earth's surface. Alternatively, the direct and reflected arrival data may be collected by a plurality of seismic receivers positioned at earth's surface in response to shots from one or more downhole seismic sources. Alternatively, the direct and reflected arrival data may be collected by a plurality of downhole seismic receivers in response to shots from one or more downhole seismic sources. At block 706, an inversion is performed using the collected direct and reflected arrival data simultaneously to determine anisotropy parameters for each of a plurality of layers of a VTI model.

The inversion process of claim 706 may include various operations as described herein. In at least some embodiments, the inversion process includes determining average anisotropy parameters for each of a plurality of layers of the VTI model from top to bottom in a layer-stripping fashion. For each layer, the collected direct and reflected arrival data may be compared with modeled direct and reflected arrival data to determine an anisotropic effect before performing the inversion. Further, for each layer, angle coverage and traveltime sensitivities for the collected direct and reflected arrival data may be plotted, and a weighting function may be selected based on the plotted angle coverage and traveltime sensitivities. In at least some embodiments, the inversion process of step 706 includes performing a generalized inverse or a grid search scheme based on the weighting function and angular dependence of traveltimes. Further, a global optimization or generalized inversion may be employed to simultaneously constrain the anisotropy parameters for each of the plurality of layers of a VTI model.

At block 708, a representation of a formation is displayed based on the inversion. For example, in at least some embodiments, the inversion process of block 706 outputs a layer-based anisotropy profile as a function of depth. Table 1 shows an example anisotropy profile as a function of depth.

TABLE 1

| Layer (#) | $\delta$ (%) | $\varepsilon$ (%) | Vp (ft/s) |
| --- | --- | --- | --- |
| 1 | 0 | 0 | 10,000 |
| 2 | 5 | 10 | 12,000 |
| 3 | 5 | 15 | 12,500 |
| 4 | 0 | 0 | 13,500 |
| 5 | 5 | 18 | 12,500 |

Additionally or alternatively, the anisotropy profile output from the inversion process may provide uncertainty or error estimates; a number of iterations used; a comparison of anisotropy parameters resulting from inversion of direct arrival data, reflected arrival data, and/or both; a comparison of simulated versus measured anisotropy parameters; shot offset information; traveltime data; direct arrival angle data; reflected arrival angle data and/or related plots or charts.

In at least some embodiments, the method 700 may include additional or alternative steps. For example, the method 700 may additionally include limiting the different shot offsets to a zero shot offset, a mid shot offset, and a far shot offset corresponding to predetermined key angles with traveltime sensitivity related to at least one of the anisotropy parameters. Further, the method 700 may additionally include selecting walkaway shot offsets including the different shot offsets based on a predetermined set of key angles with traveltime sensitivity related to at least one of the anisotropy parameters.

Embodiments disclosed herein include:

A: A seismic data analysis system that comprises seismic receivers to collect seismic survey data, wherein the seismic survey data includes direct and reflected arrival data in response to at least one seismic source fired at different shot offsets, memory that stores the collected seismic survey data, and a processing unit that extracts traveltimes for direct and reflected arrivals from the seismic survey data and performs an inversion using the direct and reflected arrival traveltimes simultaneously to determine anisotropy parameters, including Thomsen parameters, epsilon ($\varepsilon$) and delta ($\delta$), for at least one layer of a vertical transversely isotropic (VTI) model.

B: A method for seismic data analysis that comprises triggering at least one seismic source at different shot offsets, collecting direct and reflected arrival data in response to said triggering by a plurality of seismic receivers, performing an inversion using the collected direct and reflected arrival data simultaneously to determine anisotropy parameters, including Thomsen parameters, epsilon ($\varepsilon$) and delta ($\delta$), for each of a plurality of layers of a vertical transversely isotropic (VTI) model, and displaying an anisotropy profile as a function of depth based on the inversion.

Each of the embodiments, A and B may have one or more of the following additional elements in any combination. Element 1: further comprising a user interface that displays an anisotropy profile as a function of depth based on the inversion. Element 2: the different shot offsets are limited to a zero shot offset, a mid shot offset, and a far shot offset corresponding to a predetermined set of key angles with traveltime sensitivity related to at least one of the anisotropy parameters. Element 3: the different shot offsets corresponds to walkaway shot offsets that include a predetermined set of key angles with traveltime sensitivity related to at least one of the anisotropy parameters. Element 4: the processing unit performs the inversion to determine average anisotropy parameters for each of a plurality of layers of the VTI model. Element 5: the processing unit performs the inversion for each of the plurality of layers in a layer-stripping fashion using direct arrival times and reflected arrival times for each layer. Element 6: the processing unit compares the collected direct and reflected arrival data with modeled direct and reflected arrival data to determine an anisotropic effect before the inversion is performed for each of said at least one layer. Element 7: the processing unit plots angle coverage and traveltime sensitivities for the collected direct and reflected arrival data, and selects a weighting function based on the plotted angle coverage and traveltime sensitivities. Element 8: the processing unit performs the inversion for each of said at least one layer based on the weighting function and angular dependence of traveltimes. Element 9: the inversion corresponds to a generalized inverse or a grid search scheme. Element 10: the processing unit simultaneously constrains the anisotropy parameters for each of a plurality of layers of the VTI model using a global optimization or generalized inversion. Element 11: the at least one seismic source is positioned at earth's surface and the seismic receivers are positioned downhole. Element 12: the at least one seismic source is positioned downhole and the seismic receivers are positioned at earth's surface. Element 13: the at least one seismic source and the seismic received are positioned downhole.

Element 14: further comprising limiting the different shot offsets to a zero shot offset, a mid shot offset, and a far shot offset corresponding to predetermined key angles with traveltime sensitivity related to at least one of the anisotropy parameters. Element 15: further comprising selecting walkaway shot offsets including the different shot offsets based on a predetermined set of key angles with traveltime sensitivity related to at least one of the anisotropy parameters.

Element 16: performing the inversion comprises determining average anisotropy parameters for each of a plurality of layers of the VTI model from in a layer-stripping fashion. Element 17: further comprising positioning the at least one seismic source at earth's surface and positioning the plurality of seismic receivers downhole. Element 18: further comprising positioning the at least one seismic source downhole and positioning the plurality of seismic receivers at earth's surface. Element 19: further comprising positioning the at least one seismic source downhole and positioning the plurality of seismic receivers downhole. Element 20: the inversion corresponds to a generalized inverse or a grid search scheme based on a weighting function and angular dependence of traveltimes, and wherein the inversion outputs a layer-based anisotropy profile listed as a function of depth. Element 21: further comprising simultaneously constraining the anisotropy parameters for each of the plurality of layers of the VTI model using a global optimization or generalized inversion.

Numerous other variations and modifications will become apparent to those skilled in the art once the above disclosure is fully appreciated. It is intended that the following claims be interpreted to embrace all such variations and modifications where applicable.

What is claimed is:

1. A seismic data analysis system, comprising:
   seismic receivers to collect seismic survey data, wherein the seismic survey data includes direct and reflected arrival data in response to at least one seismic source fired at different shot offsets;
   memory that stores the collected seismic survey data; and
   a processing unit that extracts traveltimes for direct and reflected arrivals from the seismic survey data and performs an inversion using the direct and reflected arrival traveltimes simultaneously to determine anisotropy parameters, including Thomsen parameters, epsilon ($\varepsilon$) and delta ($\delta$), for at least one layer of a vertical transversely isotropic (VTI) model.

2. The system of claim 1, further comprising a user interface that displays an anisotropy profile as a function of depth based on the inversion.

3. The system of claim 1, wherein the different shot offsets are limited to a zero shot offset, a mid shot offset, and a far shot offset corresponding to a predetermined set of key angles with traveltime sensitivity related to at least one of the anisotropy parameters.

4. The system of claim 1, wherein the different shot offsets corresponds to walkaway shot offsets that include a predetermined set of key angles with traveltime sensitivity related to at least one of the anisotropy parameters.

5. The system of claim 1, wherein the processing unit performs the inversion to determine average anisotropy parameters for each of a plurality of layers of the VTI model.

6. The system of claim 5, wherein the processing unit performs the inversion for each of the plurality of layers in a layer-stripping fashion using direct arrival times and reflected arrival times for each layer.

7. The system of claim 1, wherein the processing unit compares the collected direct and reflected arrival data with modeled direct and reflected arrival data to determine an anisotropic effect before the inversion is performed for each of said at least one layer.

8. The system of claim 7, wherein the processing unit plots angle coverage and traveltime sensitivities for the collected direct and reflected arrival data, and selects a weighting function based on the plotted angle coverage and traveltime sensitivities.

9. The system of claim 8, wherein the processing unit performs the inversion for each of said at least one layer based on the weighting function and angular dependence of traveltimes.

10. The system of claim 1, wherein the inversion corresponds to a generalized inverse or a grid search scheme.

11. The system of claim 1, wherein the processing unit simultaneously constrains the anisotropy parameters for each of a plurality of layers of the VTI model using a global optimization or generalized inversion.

12. The system of claim 1, wherein the at least one seismic source is positioned at earth's surface and the seismic receivers are positioned downhole.

13. The system of claim 1, wherein the at least one seismic source is positioned downhole and the seismic receivers are positioned at earth's surface.

14. The system of claim 1, wherein the at least one seismic source and the seismic receivers are positioned downhole.

15. A method for seismic data analysis, comprising:
triggering at least one seismic source at different shot offsets;
collecting, by a plurality of seismic receivers, direct and reflected arrival data in response to said triggering;
performing an inversion using the collected direct and reflected arrival data simultaneously to determine anisotropy parameters, including Thomsen parameters, epsilon ($\varepsilon$) and delta ($\delta$), for each of a plurality of layers of a vertical transversely isotropic (VTI) model; and
displaying an anisotropy profile as a function of depth based on the inversion.

16. The method of claim 15, further comprising limiting the different shot offsets to a zero shot offset, a mid shot offset, and a far shot offset corresponding to predetermined key angles with traveltime sensitivity related to at least one of the anisotropy parameters.

17. The method of claim 15, further comprising selecting walkaway shot offsets including the different shot offsets based on a predetermined set of key angles with traveltime sensitivity related to at least one of the anisotropy parameters.

18. The method of claim 15, wherein performing the inversion comprises determining average anisotropy parameters for each of a plurality of layers of the VTI model from in a layer-stripping fashion.

19. The method of claim 15, further comprising positioning the at least one seismic source at earth's surface and positioning the plurality of seismic receivers downhole.

20. The method of claim 15, further comprising positioning the at least one seismic source downhole and positioning the plurality of seismic receivers at earth's surface.

21. The method of claim 15, further comprising positioning the at least one seismic source downhole and positioning the plurality of seismic receivers downhole.

22. The method of claim 15, wherein the inversion corresponds to a generalized inverse or a grid search scheme based on a weighting function and angular dependence of traveltimes, and wherein the inversion outputs a layer-based anisotropy profile listed as a function of depth.

23. The method of claim 15, further comprising simultaneously constraining the anisotropy parameters for each of the plurality of layers of the VTI model using a global optimization or generalized inversion.

* * * * *

UNITED STATES PATENT AND TRADEMARK OFFICE
CERTIFICATE OF CORRECTION

PATENT NO. : 10,371,842 B2
APPLICATION NO. : 14/779288
DATED : August 6, 2019
INVENTOR(S) : Ran Zhou et al.

Page 1 of 1

It is certified that error appears in the above-identified patent and that said Letters Patent is hereby corrected as shown below:

In the Specification

In Column 8, Line 35, delete "I shows" and insert --1 shows--

Signed and Sealed this
Fourth Day of February, 2020

Andrei Iancu
*Director of the United States Patent and Trademark Office*